2 Sheets—Sheet 1.

J. H. HEINZ.
Vegetable Assorters.

No. 212,000. Patented Feb. 4, 1879.

WITNESSES:
John H. Torrance
Eno F. Ullwood

John H. Heinz.
INVENTOR
per John B. Geyser.
ATTORNEY

J. H. HEINZ.
Vegetable Assorters.

No. 212,000. Patented Feb. 4, 1879.

WITNESSES:

John H. Heinz.
INVENTOR
per John B Geyser,
ATTORNEY

UNITED STATES PATENT OFFICE.

JOHN H. HEINZ, OF SHARPSBURG, PENNSYLVANIA.

IMPROVEMENT IN VEGETABLE-ASSORTERS.

Specification forming part of Letters Patent No. 212,000, dated February 4, 1879; application filed April 8, 1878.

*To all whom it may concern:*

Be it known that I, JOHN H. HEINZ, of Sharpsburg, in the county of Allegheny and State of Pennsylvania, have invented new and useful Improvements in Machines for Assorting Vegetables, Fruits, Pickles, &c., according to their size, which improvements are fully set forth in the following specification, reference being had to the accompanying drawings, in which—

Figure 1:
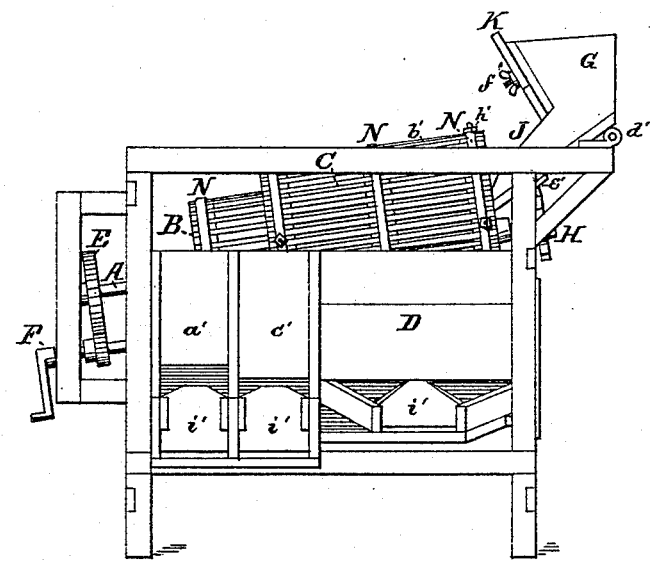
Figure 2:
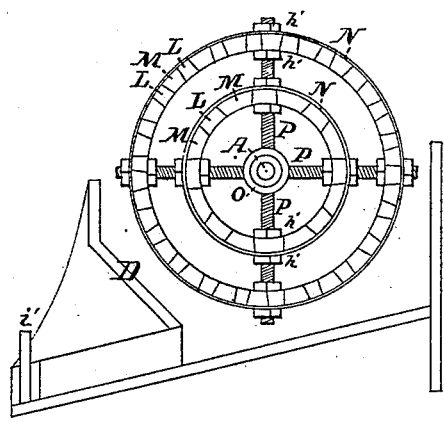
Figure 3:
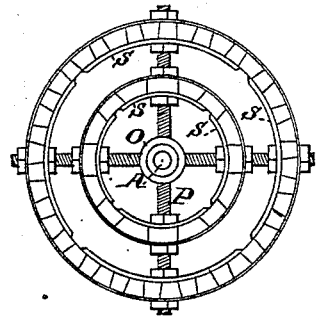

Figure 1, Plate 1, is a side view of the machine. Fig. 2, Plate 2, is an end view of the shaft and cylinders; and Fig. 3, a variation in construction by means of a curved washer.

The object of my invention is to assort in different sizes or grades vegetables, fruits, &c., intended for preserving, pickling, or the market, in a rapid and certain manner.

My machine consists of a suitable frame, in which is mounted the main shaft A, bearing the assorting-cylinders B and C. The shaft is set at an incline, so that the vegetables, &c., submitted to the action of the assorting-cylinders, and retained therein, shall have a continuous forward and downward motion until they are discharged from the lower end of the cylinders into the hoppers below. These cylinders B and C are constructed with longitudinal slots or openings $b'$ $b'$, for the passage, as it revolves, of the vegetables, &c., less than the size the cylinder is gaged to retain, the first cylinder, B, having the largest openings, as it is the receiving-cylinder, and assorts the largest size. The vegetables that pass from this into the second cylinder, C, are again assorted by the smaller-sized openings contained in it, those that pass through being caught in the large hopper D, while $c'$ receives the intermediate size, retained in the cylinder C, and $a'$ the largest size, held by the cylinder B. E is a large spur-wheel at the lower end of the shaft A, and the whole machine receives motion through it by means of the crank and pinion F. G is a hopper, for the reception of the unassorted vegetables, &c. It is pivoted on the highest part of the frame by a cross-bar, $d'$. It has a vibrating motion communicated by the ratchet H, working on the slide-pin $e'$, which causes its contents to move down the spout J into the receiving-cylinder B, the flow of the vegetables, &c., being regulated by the slide-door or gate K, which is set at any desired amount of opening by the nut and screw $f'$.

In constructing the assorting-cylinders, I prefer hard wood, but do not confine myself to it, but use any material suitable for the purpose. The long bars L (see Fig. 2) are made in one piece, and the stop-bars M, to form the opening, placed between. The whole is then bound by iron hoops N, to retain the cylinder in shape and position. Binding-wire and other material can be used for this purpose, if desired.

The cylinders are secured to the main shaft by the hubs O, in which are tapped sockets for the reception of the arms P P. Any number of arms may be used. These arms are provided with a continuous thread from end to end, as otherwise it would be difficult to secure and hold the cylinders in place. The cylinders are secured to the arms by the lock-nuts $h'$ $h'$, one on the outside and one on the interior of the cylinders. The cylinders may also be strengthened by a suitable washer, bent to conform to the interior curve of the cylinder and secured by the nut, as shown at S on the drawing in Fig. 3.

Any number of cylinders may be used with gradually-decreasing openings in accordance with the number of sizes into which the vegetables, &c., may be desired to be graded. The largest-grade cylinder is longer than the next size below, and this extra length is closed, as it simply carries the contents of the cylinder to the hopper into which it discharges. The same rule applies to each succeeding cylinder, where more than two are used.

The hoppers $a'$, $c'$, and D are each closed by slide-gates $i'$ $i'$ $i'$, for retaining their contents until it is desirable to remove them.

The revolving motion of the cylinders causes the vegetables to distribute themselves over the surface and pass through the bars, when small enough to do so; and the vibrating motion of the supply-hopper causes a steady feed, preventing any clogging.

It is evident that the tapering of the assorters B and C would not alter the results, and I do not confine myself to any form of assorter with longitudinal slots that can be mounted on a shaft and preserve the same relation to each other as the cylinders herein shown.

Having thus described my invention, I claim—

The two or more inclined slotted cylinders B C, of unequal diameters, arranged one within the other, and held in position upon a single center-shaft by means of the hubs O, screw-arms P, and interior and exterior lock-nuts, $h'$ $h'$, substantially as and for the purposes herein set forth.

JOHN H. HEINZ.

Witnesses:
    JNO. FALLWOOD,
    FRANK HUGHEY.